Patented Oct. 23, 1934

1,978,247

UNITED STATES PATENT OFFICE 1,978,247

MANUFACTURE OF ADHESIVE MATERIALS FROM RUBBER LATEX

Robert Bertram Fisher Frank Clarke, Bramhall, Edwin Brew Robinson, Moston, and Arnold Shepherdson, Chorlton-Cum-Hardy, England, assignors to Imperial Chemical Industries Limited, Westminster, England No Drawing. Application June 10, 1931, Serial No. 543,382. In Great Britain June 19, 1930

10 Claims. (Cl. 134—23.6)

This invention relates to the preparation of adhesive materials from rubber latex. It is known that products of the kind described may be obtained from isolated raw rubber, such as crepe or smoked sheet, by incorporating certain chemical agents into the raw rubber on the mill, and subsequently applying heat or other treatment. Such processes involve troublesome mechanical operations.

It is an object of the present invention to obtain products of the kind described directly from rubber latex. It is a further object to avoid the isolation of the raw rubber mass and the subsequent mechanical operations of milling or mastication. Considerable technical advantages thus accrue from the invention.

According to the invention we "cream" without coagulating the latex, in presence or absence of a protective colloid, by adding a weak organic acid; we next add a strong acid or acid forming substance; then heat the so-obtained mixture until volatile matter is removed, and bake the residuum until a chemical reaction takes place between the non-aqueous constitutents of the latex and the strong acid or acid-forming substance.

The latex used in accordance with the invention may be the raw product of the rubber plant, or it may be an artificially concentrated form, such as is known under the trade-names of "Revertex", "Jatex" (cf. Hauser, "Latex, its Occurrence, Collection, etc." New York, 1930).

When the proportion of water in the latex used is high, it may be convenient or necessary to submit the "creamed" latex to a concentration process under conditions (described below) such that coagulation does not take place. This may be effected by a suitably controlled evaporation process, e. g., by evaporating at a low temperature. We may also introduce a protective colloid such as casein, glue, or silicic acid.

The strong acid or acid-forming substance used in accordance with the invention is sulphuric acid or an aryl-sulphonic acid (e. g. benzenesulphonic acid, p-toluenesulphonic acid). Chlorosulphonic acid, methyl sulphate, benzene sulphonic chloride, are instances of acid-forming substances that may be used. These substances will be referred to in the claims by the term "an acid substance exerting strongly acidic properties" which term is to be construed to include all of these substances and their chemical equivalents.

The product obtained after baking in accordance with the invention is, when cold, a hard black mass which may be milled and is preferably washed with water until free from acid. It then forms a brown homogeneous mass, hard and tough at room temperature, which sinters at 70–100° C., melts at 250–300° C., and which possesses valuable properties as an adhesive for uniting, e. g. rubber and metal surfaces.

The following examples illustrate the method of carrying out our invention, without limiting it, the parts being by weight:

Example 1

To 100 parts of ammoniacal latex, containing approximately 40% of rubber and 0.8% ammonia, are added, with stirring, 450 parts of a 1% solution of acetic acid, the temperature being kept at 5° C.–10° C. The latex thus becomes "creamed". The mixture is concentrated by evaporating at 40–50° C. until it is of a pasty consistency. To it is then added, with gentle stirring, 156.5 parts of 10% sulphuric acid and the acidified paste is caused to evaporate slowly at a temperature of 40–50° C. until it becomes stiff. This stiff paste is transferred to a suitable shallow vessel and is first heated at about 90–120° C. until it is black and homogeneous and free from moisture. It is then further heated at a somewhat higher temperature, e. g. 150° C. until the desired reaction is complete.

The resulting product is a hard black mass which softens on warming. It is washed and homogenised, as desired, in any suitable way.

Example 2

To 1,000 parts of 20% "Revertex" are added, with stirring, 20 parts of commercial aqueous sodium silicate of specific gravity 1.42. The mixture is now acidified by adding 15 parts of 16% acetic acid. With continued stirring, 250 parts of 10% aqueous sulphuric acid is added. The mixture is transferred to a suitable vessel, dried at about 110° C. until it is black and homogeneous, and finally baked at about 150° C. until, on cooling, it is hard and tough. The cooled product is milled in a friction mill and washed with water until acid free.

Example 3

To 250 parts of "Revertex" of 20% rubber content are added, whilst stirring, 55 parts of a 12% aqueous solution of sodium silicate. Stirring is continued for 15 minutes, the mixture being kept at the ambient temperature. To the mixture is now added cautiously 20 parts of 10% aqueous acetic acid. It then becomes acid to litmus. After adding 16 parts of benzene sulphonic acid, the mixture is evaporated to a thick paste at 40–60° C. for 12 hours and baked at 150° C. for 5 hours. The product is a brownish black mass which softens between 70–80° C. After milling and washing free from acid in a friction mill, a light brown homogeneous mass is obtained similar in texture to leather. When heated to 70° it becomes soft and tacky.

Since many embodiments of this invention, differing widely in one or more respects, may be made without departing from the spirit of our invention, it is to be understood that we do not limit ourselves to the foregoing examples or description except as indicated in the following claims:

We claim:

1. A process for the manufacture of adhesive materials from rubber latex which comprises creaming without coagulating the latex, adding an acid substance of the group consisting of sulphuric acid, benzene sulphonic acid, p-toluene sulphonic acid and derivatives thereof adapted to release such acids, heating the mixture to remove volatile matter, and baking the residuum until a chemical reaction takes place between the non-aqueous constitutents of the latex and the acid substance.

2. A process for the manufacture of adhesive materials from rubber latex which comprises creaming without coagulating the latex, adding an acid substance exerting strongly acidic properties, heating the mixture to remove volatile matter, and then baking the residuum at a temperature of about 150° C. until a chemical reaction takes place between the non-aqueous constituents of the latex and the acid substance.

3. A process for the manufacture of adhesive materials from rubber latex which comprises creaming the latex in the presence of a protective colloid of the group consisting of casein, glue and silicic acid without coagulating the latex, adding to the creamed latex an acid substance exerting strongly acidic properties in an amount at least sufficient to coagulate uncreamed latex, heating the mixture to remove volatile matter, and then baking the residuum until a chemical reaction takes place between the non-aqueous constituents of the latex and the acid substance.

4. A process for the manufacture of adhesive materials from rubber latex which comprises creaming the latex in the presence of a protective colloid of the group consisting of casein, glue and silicic acid without coagulating the latex, adding to the creamed latex in an amount at least sufficient to coagulate uncreamed latex an acid substance of the group consisting of sulphuric acid, benzene sulphonic acid, p-toluene sulphonic acid and derivatives thereof adapted to release such acids, heating the mixture to remove volatile matter, and then baking the residuum until a chemical reaction takes place between the non-aqueous constituents of the latex and the acid substance.

5. A process for the manufacture of adhesive materials from rubber latex which comprises creaming the latex in the presence of a protective colloid of the group consisting of casein, glue and silicic acid and a small amount of a weak organic acid, adding in an amount at least sufficient to coagulate uncreamed latex an acid substance of the group consisting of sulphuric acid, benzene sulphonic acid, p-toluene sulphonic acid and derivatives thereof adapted to release such acids, removing volatile matter, and then baking the residuum until a reaction takes place between the non-aqueous constituents of the latex and the acid substance.

6. A process for the manufacture of adhesive materials from rubber latex which comprises creaming the latex in the presence of a protective colloid of the group consisting of casein, glue and silicic acid, and a small amount of acetic acid, adding in an amount at least sufficient to coagulate uncreamed latex an acid substance of the group consisting of sulphuric acid, benzene sulphonic acid, p-toluene sulphonic acid and derivatives thereof adapted to release such acids, removing volatile matter, and then baking the residuum until a reaction takes place between the non-aqueous constituents of the latex and the acid substance.

7. New adhesive materials obtainable by the process of claim 3.

8. New adhesive materials obtainable by the process of claim 4.

9. New adhesive materials obtainable by the process of claim 5.

10. New adhesive materials obtainable by the process of claim 6.

ROBERT BERTRAM
    FISHER FRANK CLARKE.
EDWIN BREW ROBINSON.
ARNOLD SHEPHERDSON.